Dec. 18, 1923.
J. M. HENTON
BEET LIFTER
Filed July 2, 1921
1,477,561
2 Sheets-Sheet 1
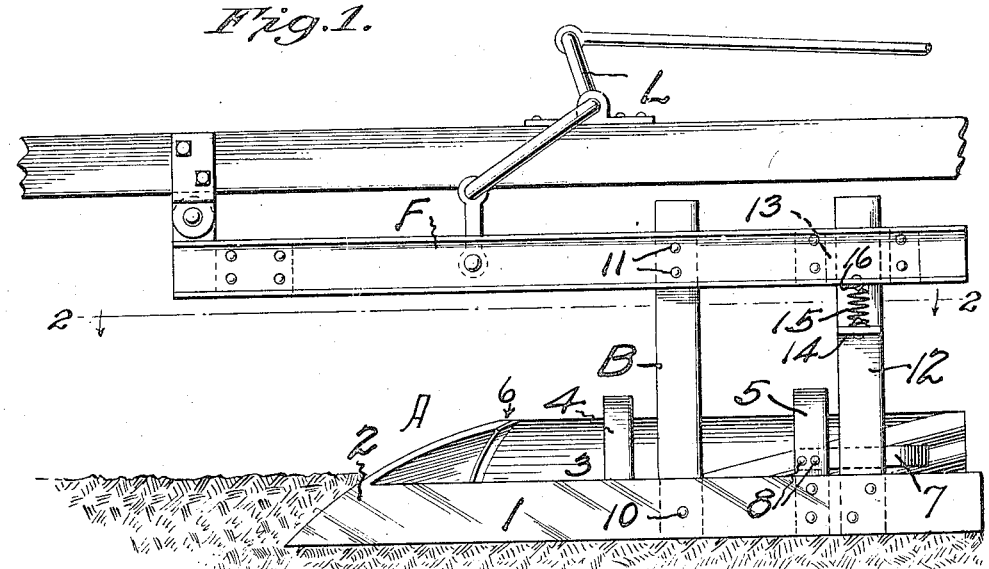
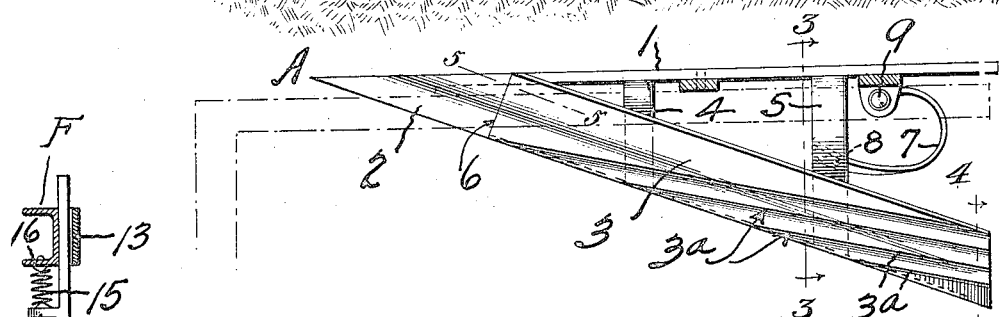
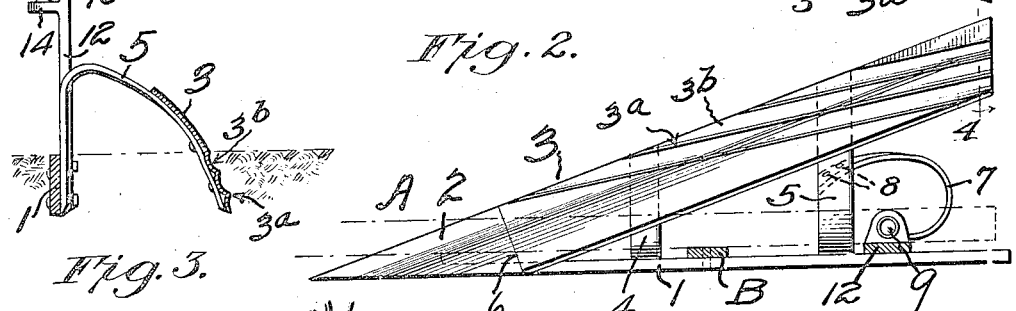
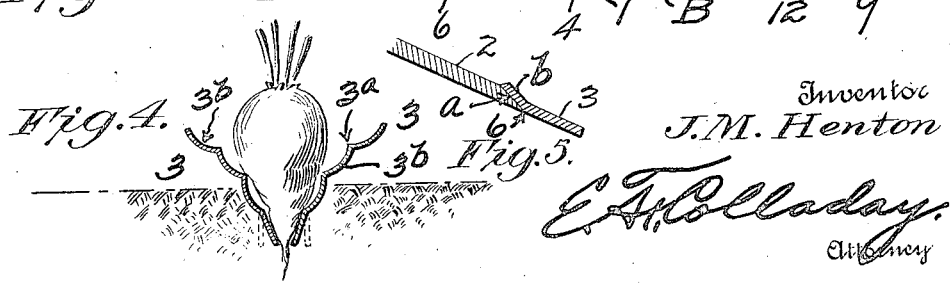
Inventor
J. M. Henton

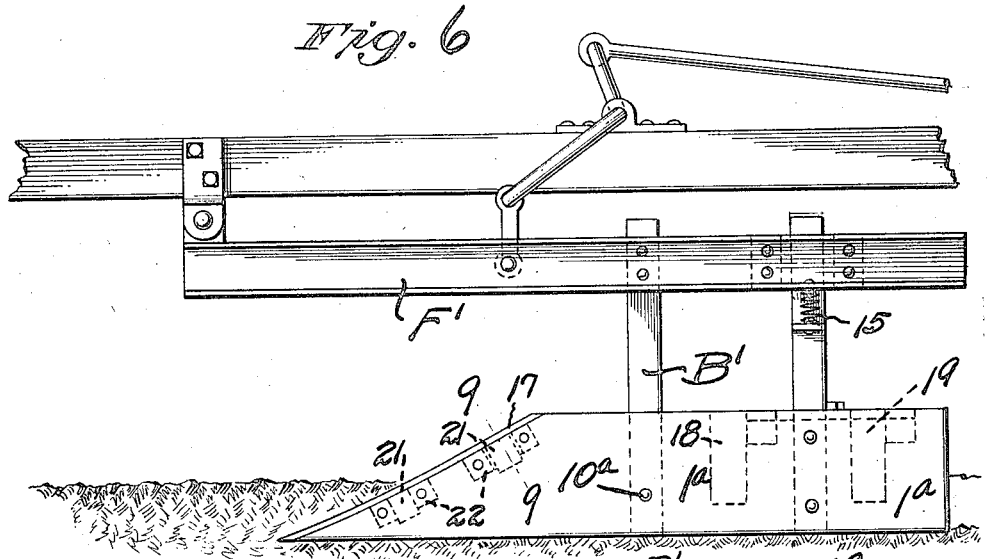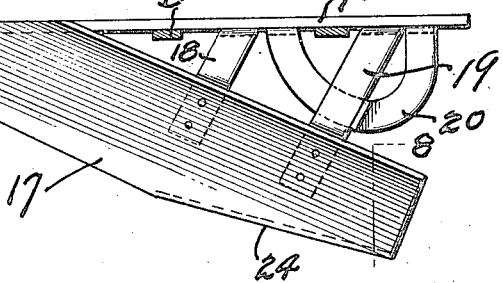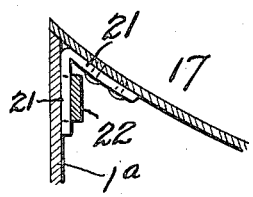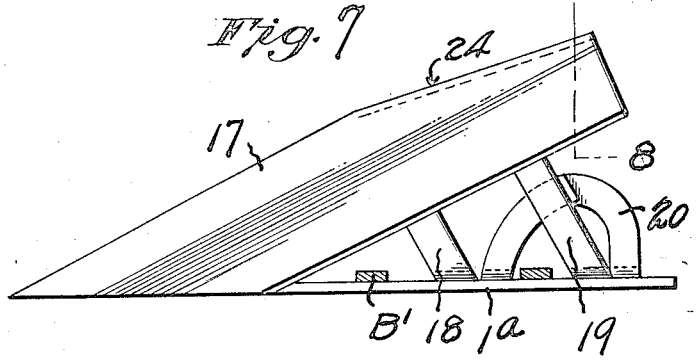

Patented Dec. 18, 1923.

1,477,561

UNITED STATES PATENT OFFICE.

JOHN M. HENTON, OF HOT SPRINGS, SOUTH DAKOTA.

BEET LIFTER.

Application filed July 2, 1921. Serial No. 482,235.

*To all whom it may concern:*

Be it known that JOHN M. HENTON, a citizen of the United States, residing at Hot Springs, in the county of Fall River, State of South Dakota, has invented a certain new and useful Improvement in Beet Lifters, of which the following is a specification.

This invention relates to an improved device for digging or lifting beets from the ground in an entirely practical and efficient manner.

A primary object of the invention is to provide a device that will lift or raise the beets from the ground in a gentle but positive manner which will avoid breaking of the root system of the beet as much as possible thereby recovering substantially, if not entirely, all of the part of the beet embedded in the earth. It is a well known fact that a certain percentage of the roots of the beet are pulled away or separated from the body of the beet by many digging devices due to the fact that they abruptly remove the body of the beet from the ground which causes the roots to break away and remain in the ground thereby involving an economic waste. It is the purpose of the present invention to eliminate or reduce this waste to a minimum, and to that end the invention proposes simple and practical means for gently and positively removing the beet from the ground to thereby recover the roots as far as possible.

A further and more specific object of the invention is to provide more or less yielding means for removing the beet from the ground. In that connection it is proposed to provide simple and reliable means for digging into the earth and lifting the beet from the ground in a safe and expeditious manner.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which—

Figure 1 is a detail side elevation of a digging unit constructed in accordance with the present invention.

Figure 2 is a top plan view thereof.

Figure 3 is a vertical sectional view taken on line 3—3 of Figure 2.

Figure 4 is a detail vertical sectional view taken on the line 4—4 of Figure 2.

Figure 5 is another detail sectional view taken on the line 5—5 of Figure 2.

Figure 6 is a side elevation of a modified form of the invention.

Figure 7 is a top plan view of the digging unit shown in Figure 6.

Figure 8 is a vertical sectional view taken on the line 8—8 of Figure 7.

Figure 9 is a detail cross-sectional view taken on the line 9—9 of Figure 6.

In carrying the present invention into effect, it is proposed to provide a novel unit adapted to enter the ground and so arranged and mounted as to yield or give upon encountering the beet to thereby exert a steady and persisting upward pull on the same to gently and yet firmly draw the beet from the earth.

One practical and convenient form for accomplishing the desired end is shown in Figures 1 and 2 of the drawings wherein it will be observed that it is proposed to utilize a pair of plow elements A, the same essentially comprising the land bar portions 1 having the points 2 and the lifting or pulling share blades 3. The digging point or toe 2 of each plow element preferably has the shape of one fourth of a cone and the share member 3 is also of substantially the same general formation so as to provide in effect a continuation of the generally conical surface formed at the front end of each plow element.

One of the novel and distinctive features of the invention is the mounting of the share blades 3 in such a manner that they may yield or give under pressure to produce the desired lifting or pulling effect upon the beet. To that end the said blades 3 are preferably mounted upon suitable springs 4 and 5 carried by the land bars 1 of the plow elements, and the construction at the point where the share member joins with the toe is such that a smooth unbroken joint is provided as indicated at 6 in Figure 5, for example. That is to say, the inner edge of the toe 2 may be bevelled as at *a* while the front edge of the share blade 3 is provided with an inclined flange portion *b* for matching therewith. The springs 4 and 5 will normally hold the parts *a* and *b* in flush contact or engagement to thereby provide a substantially continuous and unbroken lifting surface for the blade extending from the tip of the unit to the heel thereof. For the purpose of providing additional support and strength in the mounting of the share blades 3 the curved flat supporting spring 5 may be assisted by an additional supporting spring 7, the latter being attached to the spring 5 as indicated at 8 and supported on the inner face of the land bar of the plow element as indicated at 9.

Each plow element is preferably mounted upon one of the bars of the framework F which may be raised and lowered by the lever connections L to enable the entire element to be lifted off the ground for transportation purposes.

Although the plow elements may be supported in any convenient or suitable manner according to the structural features of the machine, upon which they are used, it will be understood that the land bar 1 is preferably pivoted as indicated at 10 to the lower end of a support or standard B connected to the frame F at 11. And, for the purpose of guiding the plow element and preventing lateral twisting, the same preferably carries near the rear end of the land bar an upright or guide 12 adapted to pass through the passage-way or strap 13 on the frame F and having an offset portion 14 which cooperates with the spring 15 operating against the abutment 16 formed by a portion of the frame, to yieldingly hold the rear end of the plow element into the earth.

In view of the foregoing it will be understood that the entire plow element is pivotally mounted upon the bar or standard B carried by the frame F in such a manner that it may swing in a vertical plane on the pivot 10. When the device is in use the front end of the element will dip or dig into the earth and therefore be slightly depressed at the front end while the rear end will be elevated to a certain extent but will always be guided by the parts 12 and 13 in the manner already set forth.

In connection with the share blades 3 it will be observed in the form of construction shown in Figures 1 to 4 inclusive that the said blades are provided with a plurality of inclined lifting ribs $3^a$ arranged in parallel relation so as to have an upward lifting effect as the obliquely disposed share blade passes along the beet row. These ribs are formed at the meeting edges of a plurality of grooves or concave valleys $3^b$. In addition to lifting the beet in the manner described, the ribs $3^a$ also prevent slipping of the beet from between the inner members of the plow element.

The effect of the convergently related share blades 3 is to engage the body of the beet and progressively lift the same upwardly from the ground by firm and persistent force which yields sufficiently to gradually pull the beet with its entire root system out of the ground.

A modified form of the invention is shown in Figures 6 to 9 inclusive of the drawings. It will be observed that the frame F' carrying the supporting bar B' has pivotally fitted thereto as at $10^a$ the land bar $1^a$ of the plow element. In this embodiment the share blade 17 is yieldingly mounted or carried by the relatively stout flat springs 18 and 19 affixed to the land bar $1^a$. For the purpose of providing additional support for the spring 19 the abutment 20 may be utilized, the same being located beneath the arch of the spring 19 in the manner shown in Figure 7 of the drawings to provide the desired supporting effect. The forward end of the share blade 17 is detachably connected with the land bar unit in the manner indicated in Figure 9 of the drawings. In this figure it will be observed that the blade 17 carries the relatively resilient angular coupling elements 21 adapted to fit into the straps or stirrups 22 carried by the land bar. With this arrangement it will be apparent that when the blade 17 engages the body of the beet, the latter will be yieldingly engaged due to the suspension thereof in the manner described by the springs 18 and 19 and the couplings 21. As shown in Figure 8 of the drawings the rear edge portions of the blades 17 are preferably formed at an angle to produce the depending flange or apron portions 23 for accommodating the tail or roots of the beet while the body of the beet is carried along the shoulders 24 and thereby gently lifted from the ground as the unit travels along the beet row.

From the foregoing it will be understood that the novel and distinctive feature of the present invention resides in yieldingly mounting the lifting members of the digging unit, namely the share blades, which latter are obliquely inclined in such a manner that when arranged in pairs they provide a rearwardly converging elevating and lifting trough or runway for positively and gently removing the beets and their roots from the ground.

Without further description it is thought that the features and advantages of the invention will be readily apparent and it will of course be understood that changes in the form, proportion and minor details of construction may be resorted to without departing from the spirit of the invention or scope of the appended claims.

I claim:

1. A digging unit of the class described including a plow element consisting of a rigid land bar, and a share blade yieldingly carried thereby.

2. A digging unit of the class described including a plow element consisting of a rigid land bar and an obliquely disposed share blade, and means for yieldingly supporting said share blade from the land bar.

3. A digging unit of the class described including a plow element consisting of a rigid land bar arranged in a plane parallel to the path of travel of the machine, and a plow share member obliquely disposed with reference to the land bar and yieldingly mounted with reference thereto.

4. A digging unit of the class described including a pivotally supported plow element including a yieldingly mounted share blade.

5. A digging unit of the class described including a plow element pivotally suspended from a horizontal axis arranged transversely of the path of travel of the machine, and a yieldingly mounted share blade carried thereby.

6. A digging unit of the class described including a plow element consisting of a rigid land bar, a share blade obliquely arranged with reference to the bar and springs connecting the bar and blade for permitting a yielding movement of the blade with reference to the bar when the blade is subjected to pressure.

7. A digging unit of the class described including a plow element having a relatively fixed share blade provided with a plurality of inclined ribs arranged to progressively lift the beet from the ground.

8. A digging unit of the class described including a plow element having a yieldingly mounted share blade provided with lifting ribs.

9. A digging unit of the class described including a plow element pivotally supported at its intermediate portion and means at the rear end of said plow element for yieldingly maintaining the same in its normal position.

10. A digging unit of the class described including the combination with a frame, a standard carried by the frame, a plow element pivotally suspended from the lower end of the standard, a guide trap carried by the frame, a guide bar mounted upon the rear of the plow element and having a guiding engagement in said strap, and a spring arranged between a portion of the frame and a portion of said guide bar for yieldingly maintaining the plow element in its normal position.

11. A digging unit of the class described including a plow element having a substantially conical face provided with a plurality of inclined ribs arranged to progressively lift the beets from the ground.

12. A digging unit of the class described including a plow element consisting of a cone segment provided on its face with a plurality of parallel concave valleys and intervening ribs for progressively lifting the beets from the ground.

13. A digging unit of the class described including a plow element having a conical face provided with a plurality of parallel concave valleys and intervening ribs, and means for yieldingly supporting said plow element.

In testimony whereof I hereunto affix my signature in the presence of two witnesses.

JOHN M. HENTON.

Witnesses:
B. B. PETTUS,
EMERY L. GROFF.